Sept. 26, 1939.  E. H. LAND  2,174,269

STRAIN TESTER

Filed Oct. 1, 1936

Edwin H. Land
INVENTOR.

BY Brown & Jones
ATTORNEYS.

Patented Sept. 26, 1939

2,174,269

UNITED STATES PATENT OFFICE 2,174,269

STRAIN TESTER

Edwin H. Land, Wellesley Farms, Mass., assignor, by mesne assignments, to Polaroid Corporation, Dover, Del., a corporation of Delaware Application October 1, 1936, Serial No. 103,489

5 Claims. (Cl. 88—14)

This invention relates to a new and improved apparatus employing polarized light, and more specifically to an apparatus of the character described for use in the examination of photoelastic effects or the like.

Objects of the invention are to provide a new and improved sensitive tint plate or the like for use in connection with apparatus of the character described; to provide apparatus employing such a sensitive tint plate for the examination of relatively large objects, if desired without the use of lenses and the like; to provide a sensitive tint plate the characteristics of which may be altered in a predetermined manner for use in connection with apparatus of the character described; to provide such a sensitive tint plate of resilient material, and preferably of a plastic material, such for example as a vinyl compound; and to provide means associated with apparatus of the character described for subjecting such a sensitive tint plate to variable strains, whereby its characteristics are altered.

Other objects of the invention will in part be obvious and will in part appear hereinafter.

The invention accordingly comprises the features of construction, combination of elements, and arrangement of parts, which will be exemplified in the construction hereinafter set forth, and the scope of the application of which will be indicated in the claims.

For a fuller understanding of the nature and objects of the invention, reference should be had to the following detailed description taken in connection with the accompanying drawing, wherein.

It has heretofore been customary to employ, in connection with polariscopes, strain-testers and devices utilizing polarized light for the examination of photoelastic effects, sensitive tint plates. These plates have been uniformly expensive and of small surface area, and have been found unsuited for use with the recently developed strain-testers employing relatively large areas of light-polarizing material. This invention contemplates the provision of a novel sensitive tint plate composed of material available in relatively large areas and adapted for use in connection with the aforesaid recently developed strain-testers. It contemplates moreover the provision of such a sensitive tint plate in the form of a resilient sheet with means associated therewith for altering the tension or strain placed upon said sheet when in position between a polarizer and analyzer, whereby the characteristics imparted by said sheet to the transmitted beam are predeterminedly altered.

Figure 1:
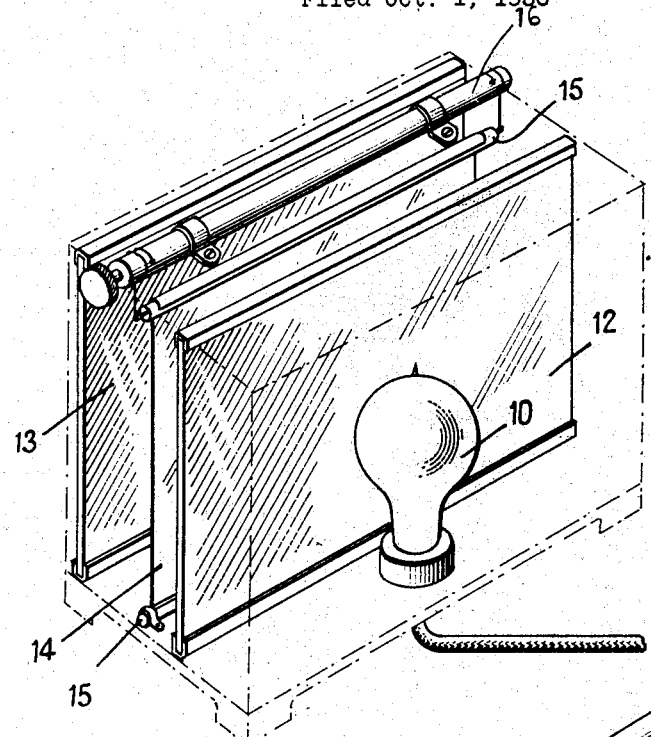
Figure 1 is a view in perspective and somewhat diagrammatic, with enclosing means omitted, of a device embodying one form of the invention.
Figure 3:
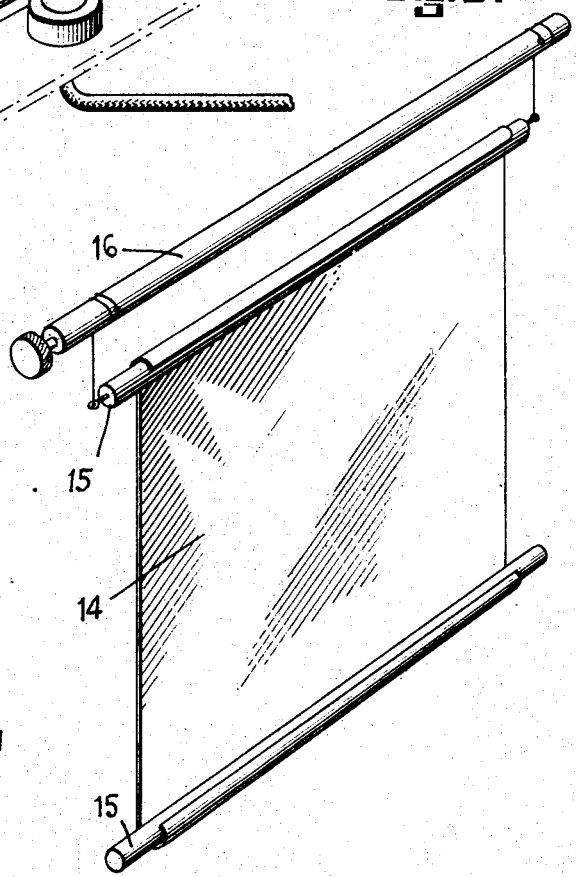
Fig. 3 is a perspective view of a variable sensitive tint plate of the type employed in the present invention, together with its mounting and supporting elements.
Figure 2:
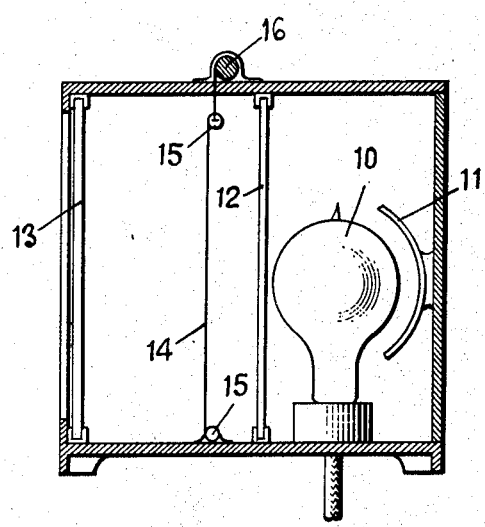
Fig. 2 is a view in elevation of the device shown in Fig. 1 with certain parts removed and other parts shown in section.

In the drawing, Figs. 1 and 2 represent a strain-tester or the like embodying the structure of the present invention. 10 represents any light source, as for example an incandescent lamp, and 11 represents any suitable reflector associated therewith. In front of the lamp is positioned a polarizer 12, which may comprise preferably a sheet of light-polarizing material mounted and held rigidly in position. This element may comprise preferably a diffusing light-polarizer, or it may have associated with it means for diffusing the light emanating from the source 10. A suitable diffusing light-polarizer may comprise a sheet of light-polarizing material, such for example as a sheet of the material made and sold under the trade name "Polaroid," laminated to the ground face of a sheet of ground glass. Where such a polarizer is employed it is to be understood that the glass supporting plate should preferably be positioned nearer the light source than the polarizing sheet, for if the polarizing element and its supporting plate are positioned closely adjacent the source, strains arising from the heating of the supporting plate may give rise to undesirable photoelastic effects therein.

13 is representative of the analyzer, which in turn may comprise a sheet of light-polarizing material such as Polaroid, mounted, if desired, on a sheet of glass.

It will of course be obvious that any suitable polarizing and analyzing means may be employed, and the light source, if one is used, may be positioned at any suitable point to illuminate the field of view.

The polarizer is preferably so positioned with respect to the analyzer that the polarizing axes of the two elements are crossed, and these elements are preferably so formed and positioned that the polarizing axis of each element is at an angle of 45° approximately to the vertical. For example, in Fig. 1 the polarizing axis of the element 12 may extend at an angle of 45° to the vertical from the upper right to the lower left portion of the element, while the polarizing axis of the element 13 may extend from the upper left to the lower right portion thereof and at an angle of 45° to the vertical. When so positioned the polarizer and analyzer are crossed, i. e., a minimum amount of light is transmitted, and if the field is viewed, as for example by an observer to the left of the device shown in Fig. 2, it will appear dark.

The sensitive tint plate 14 is preferably positioned closely adjacent the polarizer 12, and between the polarizer and the analyzer 13. This plate may comprise any light-transmitting, preferably transparent, resilient substance having a high photoelastic coefficient and preferably showing little or no cold flow. It should comprise preferably such a substance available in relatively large areas in sheet form at relatively low cost.

The preferred material for use as the sensitive tint plate of the present invention is the material now being made and sold commercially under the trade name "Vinal." This material is a vinyl compound, namely, vinyl aceto acetate, plasticized with triglycoldihexoate. It is available in sheet form in any desired area and in any desired thickness. A suitable thickness may be approximately .010 inch. This material when subjected to uniform strain, as for example by stretching, and when interposed between the polarizer and analyzer of a device such as is shown in the drawing, may function as a full wave plate for a certain predetermined portion of the spectrum, as for example the yellow-green portion, and as more or less of a full wave plate for the remaining portions of the spectrum. When subjected to a stretch of a different degree, the material may function as a full wave plate for another predetermined part of the spectrum and as more or less than a full wave plate for the remainder thereof.

Where the device is employed in connection with a structure such as is shown in the drawing, the direction of stretch of the sensitive tint plate 14 should preferably be at an angle of 45° to the polarizing axes of the polarizer and analyzer. In the device shown in Figs. 1 and 2, for example, the sensitive tint plate may be employed with means adapted to impart to it a stretch in a vertical direction, and the degree of stretch may be controlled so that the properties of the material as a sensitive tint plate may be varied at will. For example, the Vinal may be affixed to rods 15, preferably of glass, either by cementing the Vinal thereto or otherwise affixing it thereto. Care should preferably be taken to so mount the Vinal on the rods that a substantially uniform stretch over its entire surface may be secured. This may be accomplished by providing a roller 16 to which the uppermost rod may, for example, be attached in such a manner that as the roller is rotated each end of the rod is drawn toward it an equal distance. Means not shown may be provided for holding the roller in any desired position, so that the sheet 14 may be subjected to any desired stretch.

While Vinal is a preferred material for use in the present invention, it is to be understood that other materials may be employed. For example, thin sheets of rubber have been found satisfactory.

The operation of the device is as follows: The beam of light emanating from the source 10 is polarized and preferably diffused as it traverses the element 12. The element 14, which has been subjected to a predetermined strain, such for example as to impart the conventional sensitive tint to the beam, acts thereon as substantially a full wave plate in the yellow-green portions of the spectrum and as more or less than a full wave plate in the blue and red. The analyzer 13 then functions to block those portions of the beam upon which the sheet 14 has acted as a full wave plate, and the rest of the beam is transmitted. In addition to providing a sensitive tint plate of large area, the device may be adjusted until precisely a predetermined retardation is secured.

When the device is not in operation the tension on the sheet 14 may be released by reversing the direction of rotation of the roller 16 and the sheet, which is resilient, will return to its original form. Under such conditions, it may have no effect upon the characteristics of the transmitted beam of polarized light.

The preferred material for use, Vinal, shows substantially no flow when cold, and hence when the sheet is subjected to the predetermined desired strain, its properties as a sensitive tint plate remain fixed for a considerable period of time.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and useful and desire to secure by Letters Patent is:

1. In a device of the character described, in combination, a polarizer, an analyzer positioned with its polarizing axis substantially at right angles to the polarizing axis of the polarizer, a resilient sensitive tint plate positioned between the analyzer and the polarizer, and means to impart to said plate a substantially uniform stretch in a direction at an angle of substantially 45° to the polarizing axes of said polarizer and said analyzer, said plate comprising a transparent resilient sheet having a high photoelastic coefficient and showing substantially no cold flow.

2. A device of the character described comprising light-polarizing means, an analyzer, a resilient sensitive tint plate positioned between said polarizing means and said analyzer and comprising a sheet of a transparent, resilient vinyl acetal compound adapted when subjected to a predetermined stress to function as a substantially full wave plate for a portion of the visible spectrum only, means for subjecting said plate to a substantially uniform stretch, and means for altering said stretch in a predetermined and uniform manner.

3. A device for examining photoelastic effects and the like comprising, in combination, a light source, a polarizing element positioned to intercept beams emanating from said source, an analyzer positioned with its polarizing axis substantially at right angles to the polarizing axis of said polarizing element to intercept light emanating from said source and traversing said polarizing element, a sensitive tint plate comprising a transparent resilient sheet having a high photoelastic coefficient and showing substantially no cold flow positioned between the polarizer and the analyzer, means to impart to said sensitive tint plate a substantially uniform and predetermined stretch, means to hold said sensitive tint plate in said stretched position and with the direction of said stretch substantially at 45° to the direction of vibration of light transmitted by said polarizing element, and means to so position said polarizing element and said analyzer that objects to be examined may be placed therebetween.

4. In a device for examining photoelastic effects and the like and comprising a polarizer and an analyzer positioned with their polarizing axes at substantially right angles to each other and spaced from each other so as to permit objects to be examined to be placed therebetween, a transparent resilient sheet of vinyl aceto acetate showing substantially no cold flow and having a high photoelastic coefficient, means to position said sheet between said polarizer and said analyzer, means to stretch said sheet substantially uniformly and in a direction at an angle to the direction of vibration of light transmitted by said polarizing element of substantially 45°.

5. In a device of the character described, in combination, a polarizer, an analyzer positioned with its polarizing axis substantially at right angles to the polarizing axis of the polarizer, a resilient sensitive tint plate positioned between the polarizer and the analyzer and comprising a sheet of vinyl aceto acetate plasticized with triglycoldihexoate, and means to impart to said sensitive tint plate in a direction at an angle of substantially 45° to the polarizing axis of said analyzer a substantially uniform predetermined stretch, said means comprising means for fixedly holding one edge of the said sensitive tint plate and rotatable means mechanically connected to the opposite edge thereof.

EDWIN H. LAND.